(12) United States Patent
Zhou et al.

(10) Patent No.: US 12,109,895 B1
(45) Date of Patent: Oct. 8, 2024

(54) MOTION SYSTEM

(71) Applicants: Kan Zhou, Sunnyvale, CA (US); Peteris K. Augenbergs, Woodside, CA (US); Rui Guan, Sunnyvale, CA (US); Christopher D. Laws, San Jose, CA (US); Samuel James Monoogian, Campbell, CA (US); Dillon J. Thomasson, Cupertino, CA (US)

(72) Inventors: Kan Zhou, Sunnyvale, CA (US); Peteris K. Augenbergs, Woodside, CA (US); Rui Guan, Sunnyvale, CA (US); Christopher D. Laws, San Jose, CA (US); Samuel James Monoogian, Campbell, CA (US); Dillon J. Thomasson, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 575 days.

(21) Appl. No.: 17/370,606

(22) Filed: Jul. 8, 2021

Related U.S. Application Data

(60) Provisional application No. 63/082,641, filed on Sep. 24, 2020.

(51) Int. Cl.
*B60K 17/02* (2006.01)
*B60K 1/02* (2006.01)
(Continued)

(52) U.S. Cl.
CPC ............ *B60L 15/2054* (2013.01); *B60K 1/02* (2013.01); *B60K 17/02* (2013.01); *B60K 17/04* (2013.01);
(Continued)

(58) Field of Classification Search
CPC ...... B60L 15/2054; B60L 50/51; B60L 50/60; B60L 2210/40; B60L 2220/42;
(Continued)

(56) References Cited

U.S. PATENT DOCUMENTS 6,634,247 B2   10/2003   Pels et al.
8,672,069 B2   3/2014   Cherney et al.
(Continued)

FOREIGN PATENT DOCUMENTS

CN     101060289 B    1/2011
CN     103318051 B    4/2015
(Continued)

OTHER PUBLICATIONS andymark.com, "Sport Two Motor Gearbox", Product Overview, www.andymark.com/products, Downloaded Jul. 21, 2020 (3 pp).
(Continued)

*Primary Examiner* — Jacob S. Scott
*Assistant Examiner* — Farhana Pervin
(74) *Attorney, Agent, or Firm* — Young Basile Hanlon & MacFarlane, P.C.

(57) ABSTRACT

A motion system includes one or more batteries that output direct current electrical power to first and second inverters that generate first and second alternating current electrical power outputs. A first electric machine is configured to be operated by the first alternating current electrical power output. A second electric machine is configured to be operated by the second alternating current electrical power output.

18 Claims, 6 Drawing Sheets

(51) Int. Cl.
    *B60K 17/04*         (2006.01)
    *B60L 15/20*         (2006.01)
    *B60L 50/51*         (2019.01)
    *B60L 50/60*         (2019.01)
    *H02P 5/747*        (2006.01)
    *B60K 17/16*         (2006.01)

(52) U.S. Cl.
    CPC ............. *B60L 50/51* (2019.02); *B60L 50/60* (2019.02); *H02P 5/747* (2013.01); *B60K 17/165* (2013.01); *B60L 2210/40* (2013.01); *B60L 2220/42* (2013.01); *B60L 2240/12* (2013.01); *B60L 2240/50* (2013.01); *B60L 2260/20* (2013.01)

(58) Field of Classification Search
    CPC ............ B60L 2240/12; B60L 2240/50; B60L 2260/20; B60K 1/02; B60K 17/02; B60K 17/04; B60K 17/165; B60K 2702/04; B60K 2702/06; H02P 5/747
    See application file for complete search history.

(56) References Cited

U.S. PATENT DOCUMENTS

| | | | |
|---|---|---|---|
| 8,960,341 | B2 | 2/2015 | Weber |
| 9,541,167 | B2 | 1/2017 | Lindstrom et al. |
| 9,789,754 | B2 | 10/2017 | Zhu et al. |
| 11,186,162 | B2 * | 11/2021 | Schwekutsch ........... B60K 6/48 |
| 2004/0065490 | A1 | 4/2004 | Saito et al. |
| 2010/0018788 | A1 * | 1/2010 | Katsuta ................. B60K 6/365 |
| | | | 180/65.225 |
| 2010/0082188 | A1 * | 4/2010 | Ando ..................... B60L 50/16 |
| | | | 180/65.265 |
| 2012/0122629 | A1 * | 5/2012 | Akutsu .................. B60K 6/365 |
| | | | 180/65.265 |
| 2014/0151495 | A1 | 6/2014 | Kuhn, Jr. |
| 2015/0065282 | A1 * | 3/2015 | Honda ................... B60K 6/365 |
| | | | 475/6 |
| 2016/0129810 | A1 * | 5/2016 | Takahashi .............. B60K 6/445 |
| | | | 903/903 |
| 2016/0347320 | A1 * | 12/2016 | Zhu ..................... F16H 61/0403 |
| 2017/0274894 | A1 * | 9/2017 | Sato ........................ B60K 6/365 |
| 2018/0201116 | A1 * | 7/2018 | Miyagawa ............. B60K 6/547 |
| 2019/0152311 | A1 * | 5/2019 | Eo ......................... F16H 37/065 |
| 2019/0168598 | A1 * | 6/2019 | Hattori ................... B60K 23/08 |
| 2019/0263413 | A1 | 8/2019 | Hancock et al. |
| 2019/0283574 | A1 * | 9/2019 | Hummel ............... B60K 17/354 |
| 2020/0122577 | A1 * | 4/2020 | Kubo ...................... B60K 35/00 |
| 2020/0307392 | A1 * | 10/2020 | Joseph ................... B60L 50/16 |
| 2020/0361303 | A1 * | 11/2020 | Meyer ...................... B60K 1/02 |
| 2021/0070181 | A1 * | 3/2021 | Trost ......................... B60K 1/02 |
| 2021/0171015 | A1 | 6/2021 | Artail et al. |
| 2021/0291643 | A1 * | 9/2021 | Marechal ................. B60K 1/02 |
| 2021/0354684 | A1 * | 11/2021 | Healy ....................... B60L 7/14 |
| 2022/0074469 | A1 * | 3/2022 | Morimoto ............... B60L 50/13 |

FOREIGN PATENT DOCUMENTS

| | | |
|---|---|---|
| CN | 108248598 A | 7/2018 |
| CN | 108583567 A | 9/2018 |
| CN | 105644335 B | 2/2020 |
| CN | 110789350 A | 2/2020 |
| CN | 111152661 A | 5/2020 |
| JP | 2010166740 A | 7/2010 |
| JP | 2010207053 A | 9/2010 |
| JP | 5359664 B2 | 12/2013 |
| JP | 2021061681 A | 4/2021 |

OTHER PUBLICATIONS sparkfun.com, "Dual Motor Gearbox", SparkFun Electronics, www.sparkfun.com/products, Downloaded Jul. 21, 2020, (5 pp).
International Search Report and Written Opinion mailed Jul. 26, 2023, Intl. Appn. No. PCT/US2023/063319 (16 pp).

* cited by examiner

MOTION SYSTEM

CROSS-REFERENCE TO RELATED APPLICATIONS

This application claims the benefit of U.S. Patent Application No. 63/082,641, filed on Sep. 24, 2020, the content of which is incorporated herein by reference in its entirety for all purposes.

TECHNICAL FIELD

This disclosure relates to motion systems.

BACKGROUND

Motion systems may utilize electricity from a battery. The usefulness of the motion system is in part dependent on an amount of usage before the battery needs to be recharged. It is desirable to include redundant capabilities in motions systems. However, doing so typically reduces the energy efficiency and, therefore the amount of usage prior to recharging.

SUMMARY

A first aspect of the disclosure is a propulsion system. The propulsion system includes one or more batteries that output direct current electrical power. A first inverter receives the direct current electrical power from the one or more batteries and generates a first alternating current electrical power output. A first electric motor is configured to be operated by the first alternating current electrical power output from the first inverter to rotate a first motor output shaft to provide a first input torque. A second inverter receives the direct current electrical power from the one or more batteries and generates a second alternating current electrical power output. A second electric motor is configured to be operated by the second alternating current electrical power output from the second inverter to rotate a second motor output shaft to provide a second input torque. A gearbox receives the first input torque from the first motor output shaft of the first electric motor, receives the second input torque from the second motor output shaft of the second electric motor, and causes rotation of a gearbox output shaft to provide a gearbox output torque in response to the first input torque and the second input torque.

A second aspect of the disclosure is a propulsion system. The propulsion system includes a gearbox that has a gearbox input shaft and a gearbox output shaft that are each connected to a gear train to establish a geared relationship between the gearbox input shaft and the gearbox output shaft. The propulsion system also includes a first electric motor that is operable to provide a first input torque to the gearbox input shaft in response to a first alternating current electrical power output. The propulsion system also includes a second electric motor that is operable to provide a second input torque to the gearbox input shaft in response to a second alternating current electrical power output. The propulsion system also includes a first disconnect device that moves between an engaged position in which the first electric motor is mechanically coupled to the gearbox input shaft, and a disengaged position in which the first electric motor is not mechanically coupled to the gearbox input shaft. The gearbox output shaft rotates in response to at least one of the first input torque or the second input torque.

A third aspect of the disclosure is a propulsion system. The propulsion system includes a gearbox that has a gear train and a gearbox output shaft that is connected to the gear train. The propulsion system also includes a first electric motor that is operable to provide a first input torque to the gear train of the gearbox in response to a first alternating current electrical power output, and a second electric motor that is operable to provide a second input torque to the gear train of the gearbox in response to a second alternating current electrical power output, wherein the gearbox output shaft rotates in response to at least one of the first input torque or the second input torque. The propulsion system also includes a control system that switches between a first operating mode, a second operating mode, and a third operating mode. In the first operating mode, the first electric motor provides the first input torque to the gearbox, and the second electric motor does not provide the second input torque to the gearbox. In the second operating mode, the first electric motor provides the first input torque to the gearbox, and the second electric motor provides the second input torque to the gearbox. In the third operating mode, the first electric motor does not provide the first input torque to the gearbox, and the second electric motor provides the second input torque to the gearbox.

DETAILED DESCRIPTION

The disclosure herein is directed to propulsion systems for electric vehicles that use two motor-inverter pairs that are mechanically connected to a single gearbox so that one or both of the electric motors can be operated to provide an input torque to the gearbox. The propulsion systems that are described herein provide redundancy and high efficiency. These characteristics are desirable in many vehicle applications, including in autonomous vehicle applications.

Implementations of the propulsion systems that are described herein may include two independent inverter-driven electric motors (e.g., electric machines that can function as motors or generators) that are mechanically connected to a single gearbox. In one implementation, both of the electric motors are connected to an input shaft of the gearbox. In another implementation, one of the electric motors is connected to the input shaft of the gearbox and the other one of the electric motors is connected to an intermediate shaft of the gearbox. Disconnect devices are used to engage and disengage the electric motors with respect to the gearbox. In one implementation, one of the electric motors is coupled to the gearbox by a disconnect device and the other one of the electric motors is directly connected to the gearbox (e.g., by the input shaft or the intermediate shaft) without an intervening disconnect device. In another implementation, both of the electric motors are connected to the gearbox by a respective disconnect device.

Each of the two motor inverter pairs is optimized for a different operating region (e.g., ranges of speed and torque values). As a result, each is most efficient under a differing range of operating conditions relative to the other. Thus, by selecting use of both motor inverter pairs simultaneously or by selecting use of either of the two motor inverter pairs individually, based on current operating conditions, efficiency of the propulsion system is increased.

To configure the two motor inverter pairs for efficiency over different operating regions, the two electric motors could use different topologies and/or materials with respect to each other. As an example, one of the electric motors could use an interior permanent magnet rotor design and the other of the electric motors could use a surface mount permanent magnet rotor design. As another example, one of the electric motors could use a radial flux design and the other of the electric motors could use an axial flux design. As another example, one of the electric motors could use high permeability, thick laminations and the other of the electric motors could use thin laminations with low core loss.

Figure 1:
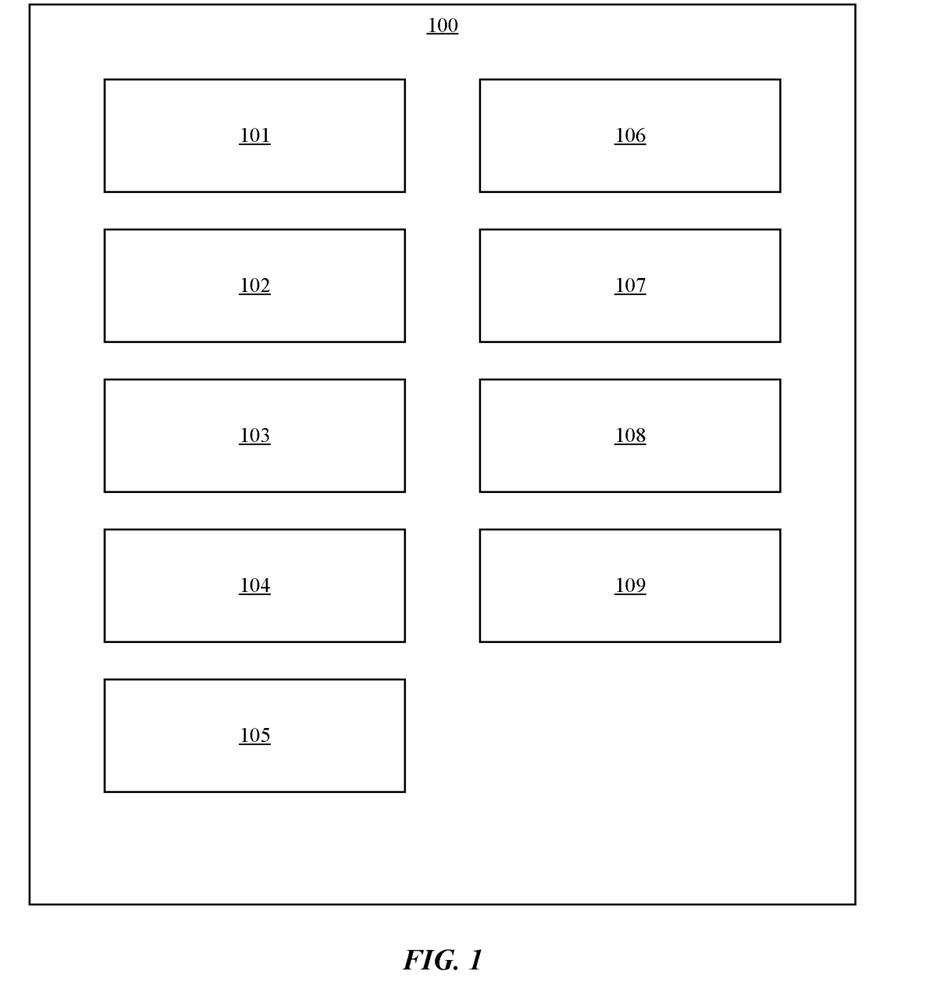
FIG. 1 is a block diagram of a vehicle.

FIG. 1 is a block diagram of a vehicle 100. As an example, the vehicle 100 may be a conventional road-going vehicle that includes a vehicle body 101 and supported by wheels 102. As an example, the vehicle 100 may be a passenger vehicle that includes a passenger compartment that is configured to carry one or more passengers. As another example, the vehicle 100 may be a cargo vehicle that is configured to carry cargo items in a cargo compartment. As another example, the vehicle 100 may be a motorcycle. In alternative implementations, some or all of the components that are described with respect to the vehicle 100 may be incorporated in different types of vehicles, such as marine vehicles or aircraft.

The vehicle 100 also includes vehicle systems that cause, control, regulate, or otherwise affect motion of the vehicle 100. These systems are connected to the vehicle body 101 and/or the wheels 102 of the vehicle 100. In the illustrated example, the vehicle 100 includes a suspension system 103, a propulsion system 104, a braking system 105, a steering system 106, a sensing system 107, a control system 108, and a battery 109. These are examples of vehicle systems that are included in the vehicle 100. Other systems can be included in the vehicle 100.

The vehicle body 101 is a structural component of the vehicle 100 through which other components are interconnected and supported. The vehicle body 101 may, for example, include or define a passenger compartment for carrying passengers. The vehicle body 101 may include structural components (e.g., a frame, subframe, unibody, monocoque, etc.) and aesthetic components (e.g., exterior body panels). The wheels 102 are connected to the vehicle body 101, for example, by components of the suspension system 103. As an example, the wheels 102 may include four wheels that support the vehicle, and each of the wheels 102 may have a pneumatic tire mounted thereto.

The suspension system 103 supports a sprung mass of the vehicle 100 with respect to an unsprung mass of the vehicle 100. The suspension system 103 is configured to control vertical motion of the wheels of the vehicle 100 relative to the vehicle body 101, for example, to ensure contact between the wheels and a surface of a roadway and to reduce undesirable movements of the vehicle body 101.

The propulsion system 104 includes propulsion components that are configured to cause motion of the vehicle 100 (e.g., by causing the vehicle 100 to accelerate). The propulsion system 104 may include components such that are operable to generate torque and deliver that torque to one or more wheels (e.g., road wheels that contact the road through tires mounted on the road wheels). Examples of components that may be included in the propulsion system 104 include motors, gearboxes, and propulsion linkages (e.g., drive shafts, half shafts, etc.). Specific configurations of the propulsion system 104 will be described in detail herein.

The braking system 105 provides deceleration torque for decelerating the vehicle 100. The braking system 105 may include friction braking components such as disk brakes or drum brakes. The braking system 105 may use an electric motor of the propulsion system 104 to decelerate the vehicle by electromagnetic resistance, which may be part of battery charging in a regenerative braking configuration.

The steering system 106 is operable to cause the vehicle to turn by changing a steering angle of one or more wheels of the vehicle 100, for example using actuators or a manually operated steering device.

The sensing system 107 includes sensors for observing external conditions of the environment around the vehicle 100 (e.g., location of the roadway and other objects) and conditions of the vehicle 100 (e.g., acceleration and conditions of the various systems and their components). The sensing system 107 may include sensors of various types, including dedicated sensors and/or components of the various systems. For example, actuators may incorporate sensors or portions of actuators may function as sensors such as by measuring current draw of an electric motor or by sensing the position of an output shaft of an electric motor. Conditions monitored by the sensing system 107 may include a vehicle speed and acceleration of the vehicle 100, a motor speed, acceleration, and torque value for each of the motors that is included in the propulsion system 104, and a wheel speed for each of the wheels 102 of the vehicle 100.

The control system 108 includes communication components (i.e., for receiving sensor signals and sending control signals) and processing components (i.e., for processing the sensor signals and determining control operations), such as a controller. The control system 108 may be a single system or multiple related systems. For example, the control system 108 may be a distributed system including components that are included in other systems of the vehicle 100, such as the suspension system 103, the propulsion system 104, the braking system 105, the steering system 106, the sensing system 107, and/or other systems.

The battery 109 is an electrical energy storage device (e.g., including many individual electrochemical cells) that is configured to supply electrical power to the other systems of vehicle 100, including, for example, the propulsion system 104. The battery 109 can be charged and discharged. The battery 109 can be charged, for example, by supply of electrical power from an external power source or by supply of electrical power from the propulsion system 104 during regenerative braking.

Figure 2:
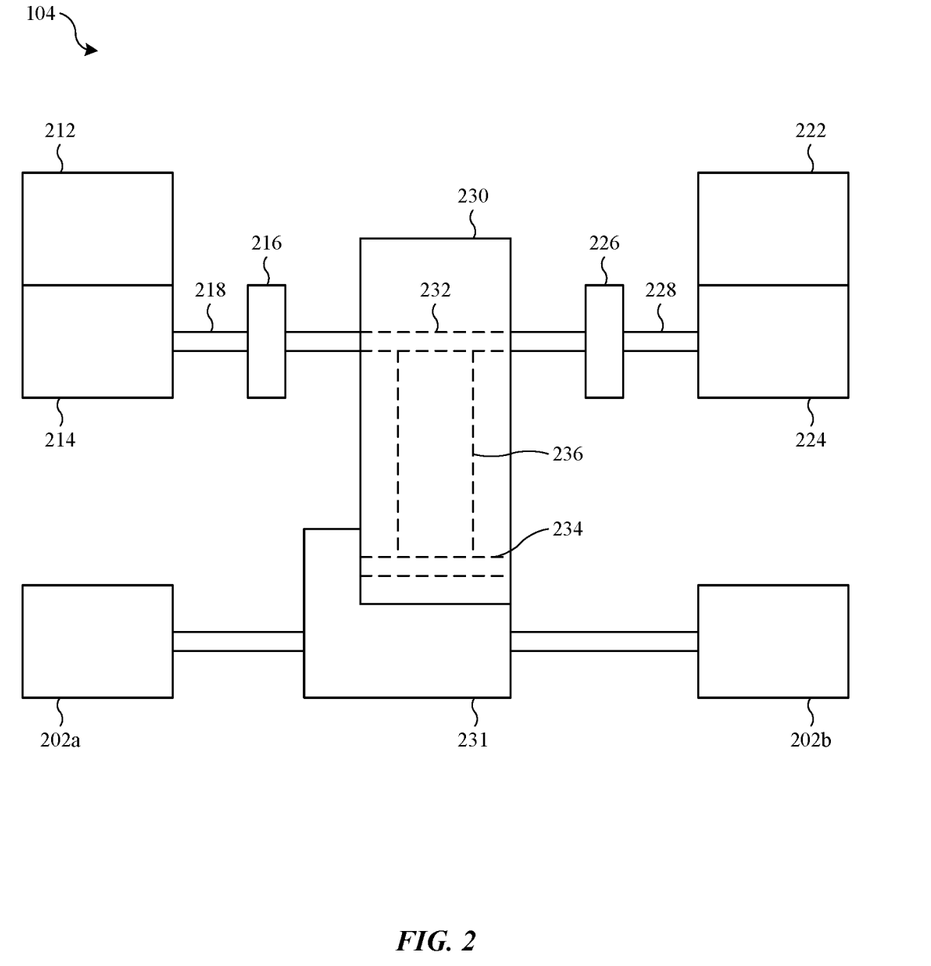
FIG. 2 is a schematic illustration that shows a propulsion system according to a first implementation.

FIG. 2 is a schematic illustration of the propulsion system 104 according to a first implementation. The propulsion system 104 includes a first inverter 212, a first electric motor 214, a first disconnect device 216, a second inverter 222, a second electric motor 224, a second disconnect device 226, and a gearbox 230. The gearbox 230 drives a first wheel 202a and a second wheel 202b, which are individual ones of the wheels 102 of the vehicle 100. In the illustrated implementation, gearbox 230 drives the first wheel 202a and the second wheel 202b through a differential device 231, that allows the first wheel 202a and the second wheel 202b to rotate independently of each other, and is implemented according to conventional designs. The first inverter 212 and the second inverter 222 are each electrically connected to the battery 109 (or to a separate battery). The battery 109 (e.g., one or more batteries) outputs direct current electrical power and supplies the direct current electrical power to the first inverter 212 and the second inverter 222. In the illustrated implementation, the first inverter 212 and the second inverter 222 are connected to the battery 109 (e.g., both are connected to a single battery), but in alternative implementations, each of the first inverter 212 and the second inverter 222 may be connected to a separate battery. Thus, electrical power may be supplied to the first inverter 212 and the second inverter 222 by one or more batteries, such as the battery 109 and additional batteries that are equivalent to the battery 109.

The first inverter 212 and the second inverter 222 are each controlled to output alternating current electrical power. The first inverter 212 and the second inverter 222 receive the direct current electrical power from the battery 109 (or from one or more batteries). Using the direct current electrical power from the battery 109 (or from one or more batteries), the first inverter 212 generates a first alternating current electrical power output and the second inverter 222 generates a second alternating current electrical power output.

The first inverter 212 is paired with and electrically connected to the first electric motor 214 to supply alternating current electrical power (e.g., the first alternating current electrical power output) to the first electric motor 214. The second inverter 222 is paired with and electrically connected to the second electric motor 224 to supply alternating current electrical power to the second electric motor 224. As an example, the first inverter 212 may supply three-phase alternating current electrical power to the first electric motor 214 and the second inverter 222 may supply three-phase alternating current electrical power to the second electric motor 224.

The first inverter 212 and the second inverter 222 may be implemented using conventional inverter designs. For example, the first inverter 212 and the second inverter 222 may be implemented using a switching-type inverter design that implements variable frequency drive to control speed and torque of the first electric motor 214 and the second electric motor 224 by varying the frequency and the voltage of the alternating current electrical power that is supplied to the first electric motor 214 and the second electric motor 224.

The first electric motor 214 is configured to be operated by the first alternating current electrical power output that is generated by the first inverter 212 to provide a first input torque to the gearbox 230. The second electric motor 224 is configured to be operated by the second alternating current electrical power output that is generated by the second inverter 222 to provide a second input torque to the gearbox 230. The terms first input torque and second input torque refer to the contributions of the first electric motor 214 and the second electric motor 224 to the gearbox 230, but are combined when input to the gearbox 230 at a common input shaft as in the illustrated implementations.

The first electric motor 214 is an electrically operated motor, which may be implemented according to any known design. Specific implementations of the first electric motor 214 will be described further herein. The first electric motor 214 causes rotation of a first motor output shaft 218 by electromagnetic interaction of a rotor and a stator, with a first motor output shaft 218 being connected to the rotor so that it is rotated by the rotor. The first motor output shaft 218 is connected to the gearbox 230, as will be explained herein, so that a torque that is generated by the first electric motor 214 (e.g., a first input torque) is provided to the gearbox 230. Thus, the first electric motor 214 is controllable, by operation of the first inverter 212, to selectively apply the first input torque to the gearbox 230 when the first electric motor 214 is operating. During regenerative braking, the first motor output shaft 218 of the first electric motor 214 is rotated by torque from the gearbox 230 to generate electric power that is returned to the battery 109.

In the illustrated implementation, the first electric motor 214 is connected to gearbox 230 by the first disconnect device 216, which allows for rotational connection and disconnection of the first electric motor 214 and the gearbox 230. The first motor output shaft 218 connects the first electric motor 214 to the first disconnect device 216. A gearbox input shaft 232 connects the gearbox 230 to the first disconnect device 216. It should be understood that, in some implementations, the first disconnect device 216 may be omitted, and the first motor output shaft 218 may be connected to the gearbox input shaft 232 so that they rotate in unison and cannot be rotationally disconnected.

The first disconnect device 216 is a mechanical device that is configured to selectively transmit torque between first and second rotatable components, which in this implementation are the first motor output shaft 218 of the first electric motor 214 and the gearbox input shaft 232 of the gearbox 230. Thus, the first disconnect device 216 may be controlled to establish a torque-transmitting connection between the first motor output shaft 218 and the gearbox input shaft 232. The first disconnect device 216 is an electromechanical system (e.g., clutch controlled by electrical actuator, solenoid, etc.) that can be controlled by commands (e.g., signals and or data) that are sent to the first disconnect device 216 by another system, such as the control system 108. Thus, first disconnect device 216 may include controllable actuator. The controllable actuator may be integrated with the other structures of the first disconnect device 216, or the controllable actuator may be remote from other structures of the first disconnect device 216 and use a mechanical or hydraulic linkage to engage and disengage the first disconnect device 216.

The first disconnect device 216 is configured to move between an engaged position and a disengaged position. In the engaged position of the first disconnect device 216, the first disconnect device 216 transmits torque from the first motor output shaft 218 to the gearbox input shaft 232 (or other torque receiving input structure of the gearbox 230). Thus, in the engaged position, rotation of the first motor output shaft 218 by the first electric motor 214 provides an input torque to the gearbox 230. In the disengaged position of the first disconnect device 216, the first disconnect device 216 has disconnected the torque-transmitting connection of the first motor output shaft 218 and the gearbox input shaft 232 so that they rotate independently of each other and torque is not transmitted between the first motor output shaft 218 and the gearbox input shaft 232. Thus, the first disconnect device 216 moves between the engaged position in which the first motor output shaft 218 is connected to the gearbox 230 so that rotation of the first motor output shaft 218 provides the first input torque to the gearbox 230, and the disengaged position in which the first motor output shaft 218 is disconnected from the gearbox 230 so that rotation of the first motor output shaft 218 does not provide the first input torque to the gearbox 230. Thus, the first motor output shaft 218 is mechanically coupled to the gearbox input shaft 232 of gearbox 230 by the first disconnect device 216 in the engaged position, and the first motor output shaft 218 is not mechanically coupled to the gearbox input shaft 232 of the gearbox 230 by the first disconnect device 216 in the disengaged position. When the first disconnect device 216 is in the engaged position, the first motor output shaft 218 of the first electric motor 214 may rotate in unison with the gearbox input shaft 232. When the first disconnect device 216 is in the disengaged position, the first electric motor 214 is able to rotate independent of the gearbox input shaft 232 so that the speed of the first motor output shaft 218 is not constrained to be equal to the speed of the gearbox input shaft 232.

The second electric motor 224 is an electrically operated motor, which may be implemented according to any known design. Specific implementations of the second electric motor 224 will be described further herein. The second electric motor 224 causes rotation of a second motor output shaft 228 by electromagnetic interaction of a rotor and a stator, with the second motor output shaft 228 being connected to the rotor so that it is rotated by the rotor. The second motor output shaft 228 is connected to the gearbox 230, as will be explained herein, so that a torque that is generated by the second electric motor 224 (e.g., a second input torque) is provided to the gearbox 230. Thus, the second electric motor 224 is controllable, by operation of the second inverter 222, to selectively apply the second input torque to the gearbox 230 when the second electric motor 224 is operating. During regenerative braking, the second motor output shaft 228 of the second electric motor 224 is rotated by torque from the gearbox 230 to generate electric power that is returned to the battery 109.

In the illustrated implementation, the second electric motor 224 is connected to gearbox 230 by the second disconnect device 226, which allows for rotational connection and disconnection of the second electric motor 224 and the gearbox 230. The second motor output shaft 228 connects the second electric motor 224 to the second disconnect device 226. A gearbox input shaft 232 connects the gearbox 230 to the second disconnect device 226. It should be understood that, in some implementations, the second disconnect device 226 may be omitted, and the second motor output shaft 228 may be connected to the gearbox input shaft 232 so that they rotate in unison and cannot be rotationally disconnected.

The second disconnect device 226 is a mechanical device that is configured to selectively transmit torque between first and second rotatable components, which in this implementation are the second motor output shaft 228 of the second electric motor 224 and the gearbox input shaft 232 of the gearbox 230. Thus, second disconnect device 226 may be controlled to establish a torque-transmitting connection between the second motor output shaft 228 and the gearbox input shaft 232. The second disconnect device 226 is an electromechanical system (e.g., clutch controlled by electrical actuator, solenoid, etc.) that can be controlled by commands (e.g., signals and or data) that are sent to the second disconnect device 226 by another system, such as the control system 108. Thus, second disconnect device 226 may include controllable actuator. The controllable actuator may be integrated with the other structures of the second disconnect device 226, or the controllable actuator may be remote from other structures of the second disconnect device 226 and use a mechanical or hydraulic linkage to engage and disengage the second disconnect device 226.

The second disconnect device 226 is configured to move between an engaged position and a disengaged position. In the engaged position of the second disconnect device 226, the second disconnect device 226 transmits torque from the second motor output shaft 228 to the gearbox input shaft 232. Thus, in the engaged position, rotation of the second motor output shaft 228 by the second electric motor 224 provides an input torque to the gearbox 230. In the disengaged position of the second disconnect device 226, the second disconnect device 226 has disconnected the torque-transmitting connection of the second motor output shaft 228 and the gearbox input shaft 232 so that they rotate independently of each other and torque is not transmitted between the second motor output shaft 228 and the gearbox input shaft 232. Thus, the second disconnect device 226 moves between the engaged position in which the second motor output shaft 228 is connected to the gearbox 230 so that rotation of the second motor output shaft 228 provides the second input torque to the gearbox 230, and the disengaged position in which the second motor output shaft 228 is disconnected from the gearbox 230 so that rotation of the second motor output shaft 228 does not provide the second input torque to the gearbox 230. Thus, the second motor output shaft 228 is mechanically coupled to the gearbox input shaft 232 of gearbox 230 by the second disconnect device 226 in the engaged position, and the second motor output shaft 228 is not mechanically coupled to the gearbox input shaft 232 of the gearbox 230 by the second disconnect device 226 in the disengaged position. When the second disconnect device 226 is in the engaged position, the second motor output shaft 228 of the second electric motor 224 may rotate in unison with the gearbox input shaft 232. When the second disconnect device 226 is in the disengaged position, the second electric motor 224 is able to rotate independent of the gearbox input shaft 232 so that the speed of the second motor output shaft 228 is not constrained to be equal to the speed of the gearbox input shaft 232.

The gearbox 230 includes the gearbox input shaft 232, a gearbox output shaft 234, and a gear train 236. The gearbox 230 may also include other components that are not shown in the illustrated implementation, such as conventional components that are included in known gearbox designs as will be appreciated by persons of skill in the art. The gearbox 230 establishes a geared relationship of the gearbox input shaft 232 and the gearbox output shaft 234 (e.g., for gear reduction of the output of the first electric motor 214 and the second electric motor 224) so that the gearbox output shaft 234 rotates in response to one or both of the first input torque and the second input torque. The gearbox 230 receives the first input torque and/or the second input torque from the first electric motor 214 and the second electric motor 224. The gearbox 230 is connected, directly or indirectly (e.g., through the differential device 231), to the first wheel 202a and the second wheel 202b by the gearbox output shaft 234 so that an output torque is applied to the gearbox output shaft 234 by the gear train 236 and is provided to the first wheel 202a and the second wheel 202b, for example, to cause motion of the vehicle 100.

Figure 3:
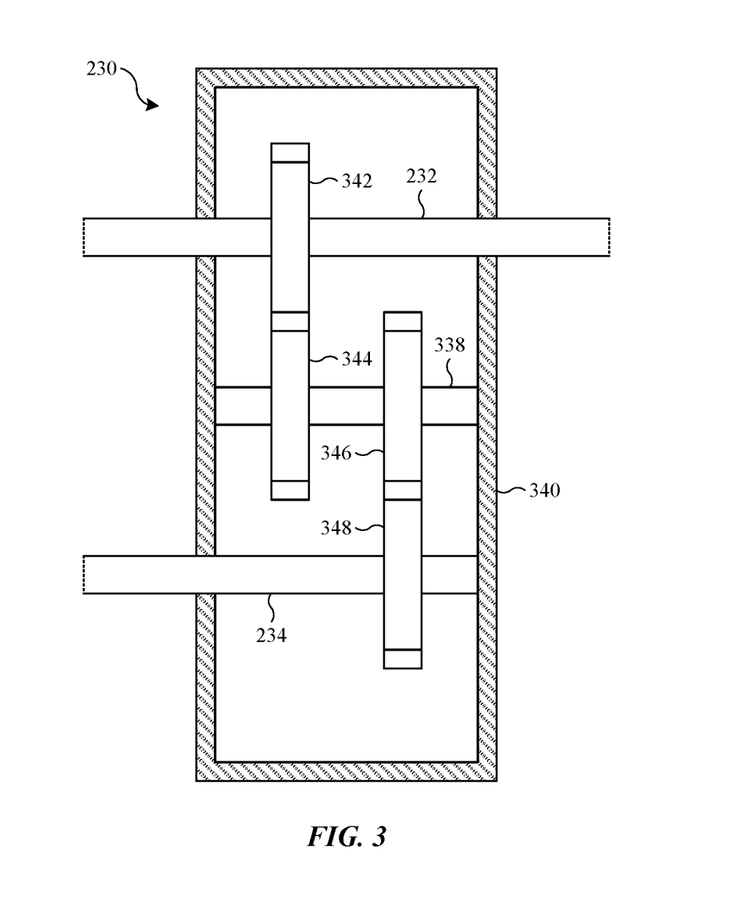
FIG. 3 is a schematic illustration that shows an example configuration for a gearbox of the propulsion system.

FIG. 3 is an illustration that shows an example configuration for the gearbox 230. In the illustrated implementation, the gearbox 230 includes an intermediate shaft 338 in addition to the gearbox input shaft 232 and the gearbox output shaft 234. The intermediate shaft 338 is connected to the gear train 236 so that it rotates when the gearbox input shaft 232 is rotated by the first input torque and/or the second input torque. In the illustrated implementation, the intermediate shaft 338 does not extend out of a gearbox housing 340 and therefore does not receive input torque from external components and/or provide output torque to external components. The intermediate shaft 338 may extend out of the gearbox housing 340 in alternative implementations.

The gear train 236 includes gears that define the geared relationship of the gearbox input shaft 232 and the gearbox output shaft 234. Other components may be included such as chains or belts. In the illustrated implementation, the gear train 236 is fixed ratio but may, in alternative implementations, may include a transmission having a selectable gear ratio (e.g., two or more gear ratios inclusive of continuously variable gear ratios). Other gearing architectures may be used. For example, the gear train 236 may be implemented using a planetary gearset.

In the illustrated implementation, the gear train 236 has an input gear 342 that is located on the gearbox input shaft 232, a first intermediate gear 344 that is located on the intermediate shaft 338 and is in engagement with (e.g., by meshing or gear teeth) the input gear 342, a second intermediate gear 346 that is located on the intermediate shaft 338, and an output gear 348 that is located on the gearbox output shaft 234 and is in engagement with the second intermediate gear 346 (e.g., by meshing or gear teeth).

The first inverter 212, the first electric motor 214, the second inverter 222, and the second electric motor 224 may be implemented using different designs and/or motor topologies in order to optimize the first electric motor 214 and the second electric motor 224 for different operating conditions.

To achieve desired operating characteristics, the design and operation of the first inverter 212 and the first electric motor 214 may be optimized as a pair. The design and operation of the second inverter 222 and the second electric motor 224 may likewise be optimized as a pair As an example, in one implementation, the first electric motor 214 is optimized for operation in a first operating speed range, and the second electric motor 224 is optimized for operation in a second operating speed range, wherein at least part of the second operating speed range is higher than a maximum operating speed of the first operating speed range. As an example, in another implementation, the first electric motor 214 is optimized for operation in a first torque range, and the second electric motor 224 is optimized for operation in a second torque range, wherein at least part of the first torque range is higher than a maximum operating torque of the second torque range.

To achieve different operating characteristics, the first electric motor 214 and the second electric motor 224 may use different motor architectures. These may be based on known designs, such as interior permanent magnet designs, surface mount permanent magnet designs, axial flux designs, and radial flux designs, and by using either of thick laminations with high permeability or thin laminations with low core loss.

In one implementation, the propulsion system 104 includes the first disconnect device 216 but omits the second disconnect device 226. In this implementation, the control system 108 is operable to switch the propulsion system 104 of the vehicle 100 between a first operating mode, a second operating mode, and a third operating mode, based on operating characteristics of the vehicle 100, such as a vehicle speed of the vehicle 100, an operating speed of the first electric motor 214, an operating speed of the second electric motor 224, an operating torque of the first electric motor 214 and/or an operating torque of the second electric motor 224. As an example, in the first operating mode, the first electric motor 214 provides the first input torque to the gearbox 230, the second electric motor 224 does not provide the second input torque to the gearbox 230, and the first disconnect device 216 is in the engaged position. As an example, in the second operating mode, the first electric motor 214 provides the first input torque to the gearbox 230, the second electric motor 224 provides the second input torque to the gearbox 230, and the first disconnect device 216 is in the engaged position. In the third operating mode, the first electric motor 214 does not provide the first input torque to the gearbox 230, the second electric motor 224 provides the second input torque to the gearbox 230, and the first disconnect device 216 is in the disengaged position.

In another implementation, the propulsion system 104 includes the first disconnect device 216 and the second disconnect device 226. In this implementation, the control system 108 is operable to switch the propulsion system 104 of the vehicle 100 between a first operating mode, a second operating mode, and a third operating mode, based on operating characteristics of the vehicle 100, such as a vehicle speed of the vehicle 100. As an example, in the first operating mode, the first electric motor 214 provides the first input torque to the gearbox 230, the second electric motor 224 does not provide the second input torque to the gearbox 230, the first disconnect device 216 is in the engaged position, and the second disconnect device 226 is in the disengaged position. As an example, in the second operating mode, the first electric motor 214 provides the first input torque to the gearbox 230, the second electric motor 224 provides the second input torque to the gearbox 230, the first disconnect device 216 is in the engaged position, and the second disconnect device 226 is in the engaged position. In the third operating mode, the first electric motor 214 does not provide the first input torque to the gearbox 230, the second electric motor 224 provides the second input torque to the gearbox 230, the first disconnect device 216 is in the disengaged position, and the second disconnect device 226 is in the engaged position.

In implementations in which the control system 108 controls the propulsion system in one of a first operating mode, a second operating mode, or a third operating mode, as previously described, the control system 108 may be configured to select the operating mode based on speed ranges for the vehicle speed, based on the rotational speeds of one or both of the first electric motor 214 and the second electric motor 224, based on operating torque values for one or both of the first electric motor 214 and the second electric motor 224, and/or based on the rotational speed of other components of the propulsion system 104, such as the differential device 231 or one of the first wheel 202a or the second wheel 202b. As one example, the control system 108 may be configured to select the first operating mode when a vehicle speed is in a first range, the control system 108 may be configured to select the second operating mode when the vehicle speed is in a second range that is higher than the first range, and the control system 108 may be configured to select the third operating mode when the vehicle speed is in a third range that is higher than the second range. As another example, the control system 108 may be configured to select the third operating mode when an operating torque is in a first torque range, the control system 108 may be configured to select the first operating mode when the operating torque is in a second torque range that is higher than the first torque range, and the control system 108 may be configured to select the second operating mode when the operating torque is in a third torque range that is higher than the second torque range. As another example, the control system 108 may be configured to select one of the first operating mode, the second operating mode, or the third operating mode based on a vehicle speed and an operating torque. For instance, torque ranges corresponding to selection of each of the first operating mode, the second operating mode or the third operating mode (along with threshold torque values between the ranges) may vary as a function of the vehicle speed or motor speed. The first, second, and third operating ranges may be described, for example, by a two dimensional mapping of motor torque and motor speed.

In addition to improving efficiency, the propulsion system 104 also provides redundancy by allowing operation of the propulsion system using only the first electric motor 214 or only the second electric motor 224. For example, upon failure of the first electric motor 214, the second electric motor 224 can be switched on, and the first electric motor 214 can be switched off. Additionally, the second disconnect device 226 can be moved to the engaged position and/or the first disconnect device 216 can be moved to the disengaged position. As another example, upon failure of the second electric motor 224, the first electric motor 214 can be switched on, and the second electric motor 224 can be switched off. Additionally, the second disconnect device 226 can be moved to the disengaged position and/or the first disconnect device 216 can be moved to the engaged position.

The propulsion system 104 also allows control according to an optimal efficiency torque split control strategy, which means that, for a given total torque command (e.g., as requested by the control system 108) at a given speed, the control system apportions the torque command between the first electric motor 214 and the second electric motor 224 in a manner that results in the lowest electrical energy consumption (and therefore highest efficiency).

The control system 108 may be configured to determine whether the propulsion system should be operated according to the optimal efficiency torque split control strategy, which will typically be the primary control strategy that is selected in order to maximize the range of the vehicle 100. Other strategies may be used under specific conditions, for example, for active thermal balancing of the motors and inverters to prevent components from reaching their thermal limits, or for wear accumulation balancing to extend the total life of the propulsion system 104 by modifying allocation of effort between the first electric motor 214 and the second electric motor 224.

Figure 4:
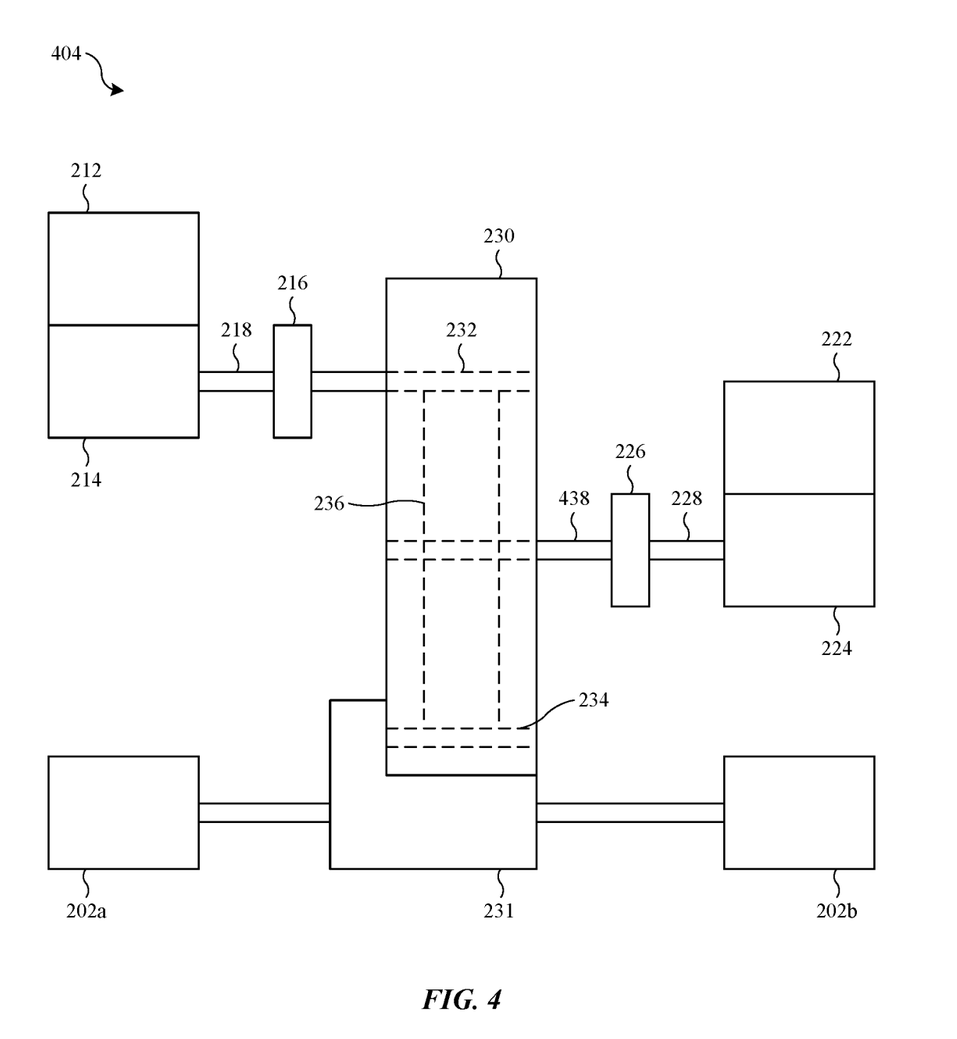
FIG. 4 is a schematic illustration that shows a propulsion system according to a second implementation.

FIG. 4 is a schematic illustration of a propulsion system 404 according to a second implementation. The propulsion system 404 is similar to the propulsion system 104. The description of the propulsion system 104 is applicable to the propulsion system 104 except as otherwise stated herein and is incorporated by reference in the description of the propulsion system 104.

The propulsion system 404 differs from the propulsion system 104 in that the second input torque is applied to an intermediate shaft 438 of the gearbox 230 instead of being applied to the gearbox input shaft 232 of the gearbox 230. The gearbox 230 is implemented as previously described except that the intermediate shaft 338 is replaced by the intermediate shaft 438, which extends out of the gearbox housing 340.

In the illustrated implementation, the second motor output shaft 228 of the second electric motor 224 is connected to the intermediate shaft 438 by the second disconnect device 226, which operates in the manner previously described.

The configuration of the gear train 236 is previously described, including a geared relationship of the gearbox input shaft 232 and the intermediate shaft 438 (e.g., as described with respect to the input gear 342 and the first intermediate gear 344). Thus, there is a geared relationship of the gearbox input shaft 232 and the intermediate shaft 438, which may be at a drive ratio that is other than one to one. Thus, a first geared relationship of the first electric motor 214 with respect to the gearbox output shaft 234 may have a different drive ratio than a second geared relationship of the second electric motor 224 with respect to the gearbox output shaft 234, in accordance with the non-one to drive ratio between the gearbox input shaft 232 and the intermediate shaft 438. This allows the first input torque and the second input torque to drive the gearbox output shaft 234 according to different drive ratios, either together or separately. The propulsion system 404 may further be controlled by the control system 108 according to the operating modes that were previously discussed with respect to the propulsion system 104.

Figure 5:
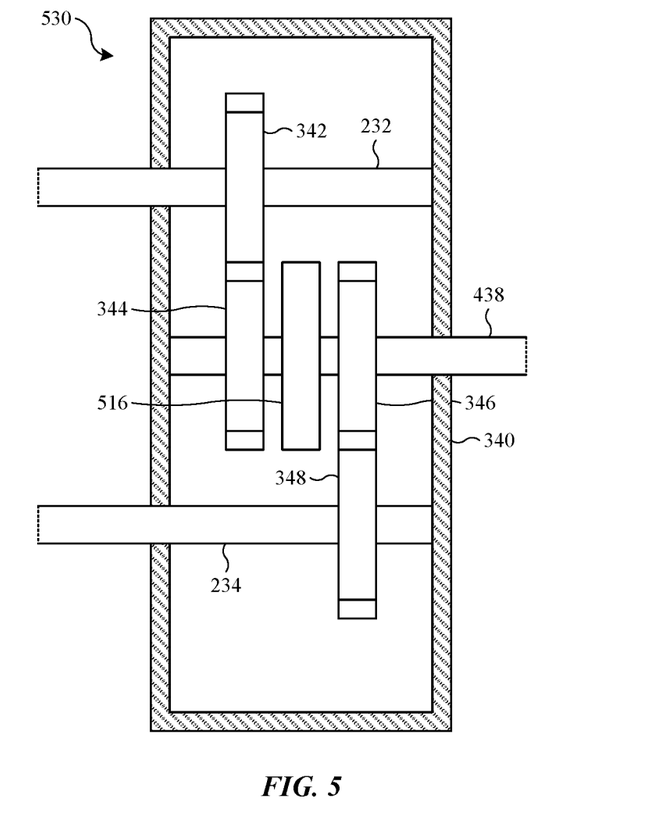
FIG. 5 is a schematic illustration that shows an alternative configuration for a gearbox of the propulsion system according to the second implementation.

FIG. 5 is a schematic illustration that shows an alternative configuration for a gearbox 530 for use in the propulsion system 404. The gearbox 530 allows the first disconnect device 216 to be omitted from the first motor output shaft 218. Instead, a first disconnect device 516 is located on the intermediate shaft 438 between the first intermediate gear 344 and the second intermediate gear 346. The first disconnect device 516 functions similarly to the first disconnect device 216, and may be implemented using a similar structural configuration. The first disconnect device 516 is configured to move between an engaged position and a disengaged position to selectively connect and disconnect transmission of torque to and from the first electric motor 214 with respect to the second electric motor 224 and the gearbox output shaft 234. In the illustrated implementation, however, this is achieved by selectively connecting and disconnecting transmission of torque between the first intermediate gear 344 and the second intermediate gear 346.

Figure 6:
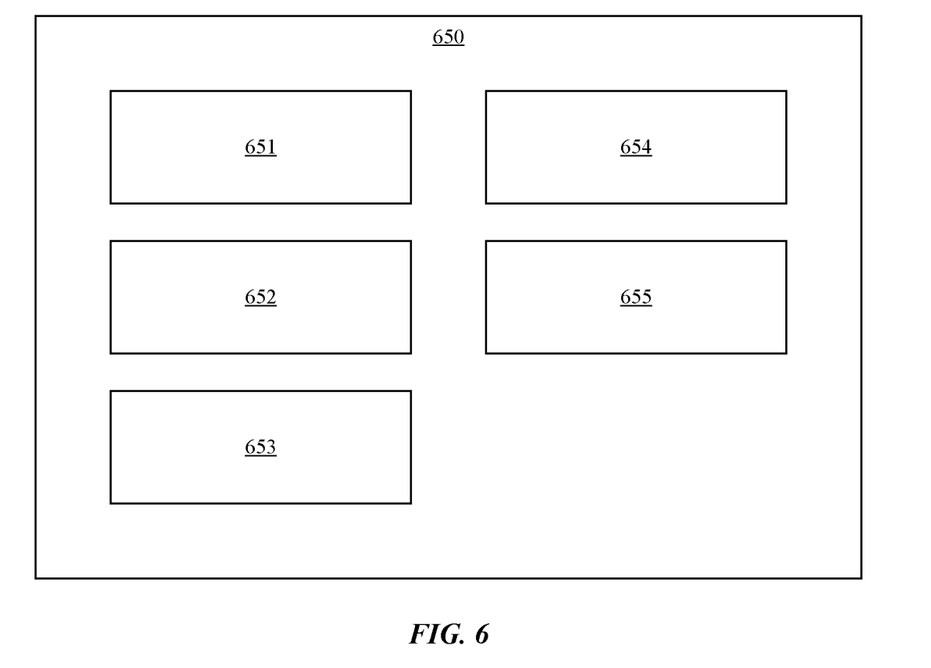
FIG. 6 is a block diagram that shows a controller.

FIG. 6 is a block diagram that shows a controller 650. The controller 650 is an example of a computing device that may be used to implement the control system 108 and/or other control systems of the vehicle 100. The controller 650 may include a processor 651, a memory 652, a storage device 653, one or more input devices 654, and one or more output devices 655. The controller 650 may include a bus or a similar device to interconnect the components for communication. The processor 651 is operable to execute computer program instructions and perform operations described by the computer program instructions. As an example, the processor 651 may be a conventional device such as a central processing unit. The memory 652 may be a volatile, high-speed, short-term information storage device such as a random-access memory module. The storage device 653 may be a non-volatile information storage device such as a hard drive or a solid-state drive. The input devices 654 may include any type of human-machine interface such as buttons, switches, a keyboard, a mouse, a touchscreen input device, a gestural input device, or an audio input device. The output devices 655 may include any type of device operable to provide an indication to a user regarding an operating state, such as a display screen or an audio output, or any other functional output or control.

As used in the claims, phrases in the form of "at least one of A, B, or C" should be interpreted to encompass only A, or only B, or only C, or any combination of A, B and C.

As described above, one aspect of the present technology is propulsion control, which may, in some implementations, include the gathering and use of data available from various sources to customize operation of a propulsion system for a vehicle based on user preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information. As one example, information describing a user of the vehicle may be collected and used to adjust propulsion system control characteristics of the vehicle based on user preferences. As another example, the vehicle may include sensors that are used to control operation of the vehicle, and these sensors may obtain information (e.g., still pictures or video images) that can be used to identify persons that are present in the image.

The present disclosure recognizes that the use of such personal information data, in the present technology, can be used to the benefit of users. For example, the personal information data can be used to develop a user profile that describes user comfort levels for certain types of motion of the vehicle.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in determining propulsion system characteristics for a vehicle, the present technology can be configured to allow users to select to "opt in" or "opt out" of participation in the collection of personal information data during registration for services or anytime thereafter. In another example, users can select not to provide personal data for use in propulsion system control. In yet another example, users can select to limit the length of time personal data is maintained or entirely prohibit the use and storage of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, customized propulsion system control can be performed using non-personal information data or a bare minimum amount of personal information, other non-personal information available to the devices, or publicly available information.

What is claimed is:

1. A propulsion system, comprising:
one or more batteries that output direct current electrical power;
a first inverter that receives the direct current electrical power from the one or more batteries and generates a first alternating current electrical power output;
a first electric motor that is configured to be operated by the first alternating current electrical power output from the first inverter to rotate a first motor output shaft to provide a first input torque;
a second inverter that receives the direct current electrical power from the one or more batteries and generates a second alternating current electrical power output;
a second electric motor that is configured to be operated by the second alternating current electrical power output from the second inverter to rotate a second motor output shaft to provide a second input torque;
a gearbox that includes a gearbox input shaft, a gearbox output shaft, and an intermediate shaft, wherein the gearbox input shaft receives the first input torque from the first motor output shaft of the first electric motor, the intermediate shaft receives the second input torque from the second motor output shaft of the second electric motor, and the gearbox output shaft rotates to provide a gearbox output torque in response to the first input torque and the second input torque; and
a first disconnect device located on the intermediate shaft that is configured to move between an engaged position in which the gearbox input shaft is mechanically coupled to the gearbox output shaft and a disengaged position in which the gearbox input shaft is not mechanically coupled to the gearbox output shaft, a second disconnect device that moves between an engaged position in which the second motor output shaft is connected to the intermediate shaft of the gearbox so that rotation of the second motor output shaft provides the second input torque to the gearbox, and a disengaged position in which the second motor output shaft is disconnected from the intermediate shaft of the gearbox so that rotation of the second motor output shaft does not provide the second input torque to the gearbox,
wherein the first electric motor has a higher energy efficiency in a first operating range as compared to a second operating range, and the second electric motor has a higher energy efficiency in the second operating range as compared to the first operating range.

2. The propulsion system of claim 1, further comprising: a control system that switches between a first operating mode, a second operating mode, and a third operating mode, wherein:
  in the first operating mode, the first electric motor provides the first input torque to the gearbox input shaft of the gearbox, the second electric motor does not provide the second input torque to the intermediate shaft of the gearbox, and the first disconnect device is in the engaged position,
  in the second operating mode, the first electric motor provides the first input torque to the gearbox input shaft of the gearbox, the second electric motor provides the second input torque to the intermediate shaft of the gearbox, and the first disconnect device is in the engaged position, and
  in the third operating mode, the first electric motor does not provide the first input torque to the input shaft of the gearbox, the second electric motor provides the second input torque to the intermediate shaft of the gearbox, and the first disconnect device is in the disengaged position.

3. The propulsion system of claim 1, further comprising: a control system that switches between a first operating mode, a second operating mode, and a third operating mode, wherein:
  in the first operating mode, the first electric motor provides the first input torque to the gearbox input shaft of the gearbox, the second electric motor does not provide the second input torque to the intermediate shaft of the gearbox, the first disconnect device is in the engaged position, and the second disconnect device is in the disengaged position,
  in the second operating mode, the first electric motor provides the first input torque to the gearbox input shaft of the gearbox, the second electric motor provides the second input torque to the intermediate shaft of the gearbox, the first disconnect device is in the engaged position, and the second disconnect device is in the engaged position, and
  in the third operating mode, the first electric motor does not provide the first input torque to the gearbox input shaft of the gearbox, the second electric motor provides the second input torque to the intermediate shaft of the gearbox, the first disconnect device is in the disengaged position, and the second disconnect device is in the engaged position.

4. The propulsion system of claim 1, wherein the gearbox includes a gear train that defines a geared relationship of the gearbox input shaft, the intermediate shaft, and the gearbox output shaft.

5. The propulsion system of claim 1, wherein the first operating range is a first operating speed range, and the second operating range is a second operating speed range, wherein at least part of the second operating speed range is higher than a maximum operating speed of the first operating speed range.

6. The propulsion system of claim 1, wherein the first operating range is a first torque range, and the second operating range is a second torque range, wherein at least part of the first torque range is higher than a maximum torque of the second torque range.

7. The propulsion system of claim 1, further comprising:
  wheels that are connected to the gearbox output shaft and are rotated by the gearbox output torque.

8. A propulsion system, comprising:
  a gearbox that has a gearbox input shaft, an intermediate shaft, and a gearbox output shaft that are each connected to a gear train to establish a geared relationship between the gearbox input shaft, the intermediate shaft, and the gearbox output shaft;
  a first electric motor that is operable to provide a first input torque to the gearbox input shaft in response to a first alternating current electrical power output;
  a second electric motor that is operable to provide a second input torque to the intermediate shaft in response to a second alternating current electrical power output;
  a first disconnect device located on the intermediate shaft that is configured to move between an engaged position in which the gearbox input shaft is mechanically coupled to the gearbox output shaft, and a disengaged position in which the gearbox input shaft is not mechanically coupled to the gearbox output shaft; and
  a second disconnect device that is configured to move between an engaged position in which the second electric motor is mechanically coupled to the intermediate shaft, and a disengaged position in which the second electric motor is not mechanically coupled to the intermediate shaft,
  wherein the intermediate shaft is configured to rotate in response to at least one of the first input torque or the second input torque, and the gearbox output shaft is configured to rotate in response to at least one of the first input torque or the second input torque.

9. The propulsion system of claim 8, further comprising:
a control system that switches between a first operating mode, a second operating mode, and a third operating mode, wherein:
  in the first operating mode, the first electric motor provides the first input torque to the gearbox, the second electric motor does not provide the second input torque to the gearbox, and the first disconnect device is in the engaged position,
  in the second operating mode, the first electric motor provides the first input torque to the gearbox, the second electric motor provides the second input torque to the gearbox, and the first disconnect device is in the engaged position, and
  in the third operating mode, the first electric motor does not provide the first input torque to the gearbox, the second electric motor provides the second input torque to the gearbox, and the first disconnect device is in the disengaged position.

10. The propulsion system of claim 9, wherein:
  in the first operating mode, the second disconnect device is in the disengaged position,
  in the second operating mode, the second disconnect device is in the engaged position, and in the third operating mode, the second disconnect device is in the engaged position.

11. The propulsion system of claim 8, further comprising:
a first inverter that generates the first alternating current electrical power output; and
a second inverter that generates the second alternating current electrical power output.

12. The propulsion system of claim 8, wherein the second disconnect device is located on the intermediate shaft.

13. A propulsion system, comprising:
a gearbox that has a gear train and a gearbox output shaft that is connected to the gear train;
a first electric motor that is operable to provide a first input torque to the gear train of the gearbox in response to a first alternating current electrical power output;
a second electric motor that is operable to provide a second input torque to the gear train of the gearbox in response to a second alternating current electrical power output, wherein the gearbox output shaft rotates in response to at least one of the first input torque or the second input torque; and
a control system that switches between a first operating mode, a second operating mode, and a third operating mode, wherein:
in the first operating mode, the first electric motor provides the first input torque to the gearbox, and the second electric motor does not provide the second input torque to the gearbox,
in the second operating mode, the first electric motor provides the first input torque to the gearbox, and the second electric motor provides the second input torque to the gearbox, and
in the third operating mode, the first electric motor does not provide the first input torque to the gearbox, and the second electric motor provides the second input torque to the gearbox,
wherein the control system is configured to select the first operating mode when a vehicle speed is in a first speed range and to select the second operating mode when the vehicle speed is in a second speed range that is higher than the first speed range, or the control system is configured to select the third operating mode when an operating torque is in a first torque range and to select the first operating mode when the operating torque is in a second torque range that is higher than the first torque range.

14. The propulsion system of claim 13, wherein the control system is configured to select the third operating mode when the vehicle speed is in a third speed range that is higher than the second speed range.

15. The propulsion system of claim 13, wherein the control system is configured to select the second operating mode when the operating torque is in a third torque range that is higher than the second torque range.

16. The propulsion system of claim 13, further comprising:
a first disconnect device that moves between an engaged position in which the first electric motor is mechanically coupled to the gear train of the gearbox, and a disengaged position in which the first electric motor is not mechanically coupled to the gear train of the gearbox, wherein the first disconnect device is in the engaged position in the first operating mode, the first disconnect device is in the engaged position in the second operating mode, and the first disconnect device is in the disengaged position in the third operating mode.

17. The propulsion system of claim 16, further comprising:
a second disconnect device that moves between an engaged position in which the second electric motor is mechanically coupled to the gear train of the gearbox, and a disengaged position in which the second electric motor is not mechanically coupled to the gear train of the gearbox, wherein the second disconnect device is in the disengaged position in the first operating mode, the second disconnect device is in the engaged position in the second operating mode, and the second disconnect device is in the engaged position in the third operating mode.

18. The propulsion system of claim 17, further comprising:
a first inverter that generates the first alternating current electrical power output; and
a second inverter that generates the second alternating current electrical power output.

* * * * *